United States Patent
Melzer et al.

(10) Patent No.: US 6,629,374 B2
(45) Date of Patent: Oct. 7, 2003

(54) METHOD AND APPARATUS FOR LINEARITY MEASUREMENT

(75) Inventors: Peter Melzer, Kiel (DE); Volker Haushahn, Kiel (DE); André Wirtz, Preetz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/001,171

(22) Filed: Nov. 4, 2001

(65) Prior Publication Data

US 2002/0083609 A1 Jul. 4, 2002

Related U.S. Application Data

(63) Continuation of application No. PCT/DE00/01134, filed on Apr. 12, 2000.

(30) Foreign Application Priority Data

May 3, 1909 (DE) .......................... 199 20 169

(51) Int. Cl.$^7$ .......................... G01B 5/02; H04N 1/047
(52) U.S. Cl. .......................... 33/555; 33/702; 358/406; 358/474
(58) Field of Search .......................... 33/702, 710, 502, 33/613, 614, 645, 555; 73/1.79, 1.81; 399/197, 208, 209; 250/231.1; 358/406, 474, 486, 497; 347/37; 400/283, 284, 285, 315, 319, 321, 323; 318/685, 696

(56) References Cited

U.S. PATENT DOCUMENTS

| | | | |
|---|---|---|---|
| 4,548,105 A | * 10/1985 | Koutonen | ........................ 83/13 |
| 4,649,497 A | 3/1987 | Carlson et al. | ................ 716/19 |
| 4,755,952 A | 7/1988 | Johns | .......................... 700/159 |
| 5,152,166 A | 10/1992 | Brock et al. | .................. 73/37.9 |
| 5,258,931 A | 11/1993 | Hassler, Jr. | .................. 702/105 |
| 5,283,668 A | * 2/1994 | Hiramatsu | ................... 358/474 |
| 5,481,155 A | * 1/1996 | Hong | .......................... 318/135 |
| 6,111,666 A | * 8/2000 | Yoshinaga | ................... 358/474 |

FOREIGN PATENT DOCUMENTS

| DE | 197 33 442 A1 | 12/1998 | ............. B41C/1/04 |
|---|---|---|---|
| DE | 197 43 943 A1 | 4/1999 | ............. B41C/1/04 |

\* cited by examiner

*Primary Examiner*—Diego Gutierrez
*Assistant Examiner*—R. Alexander Smith
(74) *Attorney, Agent, or Firm*—Laurence A. Greenberg; Werner H. Stemer; Gregory L. Mayback

(57) ABSTRACT

A method and an apparatus for measuring linearity in a reproduction appliance includes an operating carriage bearing a scanning or recording device. The operating carriage is able to be moved in discrete steps in a given direction along a straight line. The operating carriage is successively moved along partial segments of the line. Each of the partial segments is longer than a travel corresponding to one of the steps and is shorter than the entire length of the line. The partial segments each have an exactly defined length defined by an additional carriage moveable along the given direction. The number of steps needed for each partial segment are counted and deviations between values for a travel of the operating carriage resulting from the partial segment and values for the travel of the operating carriage resulting from counting the steps are calculated.

28 Claims, 2 Drawing Sheets

METHOD AND APPARATUS FOR LINEARITY MEASUREMENT

CROSS-REFERENCE TO RELATED APPLICATION

This application is a continuation of copending International Application No. PCT/DE00/01134, filed Apr. 12, 2000, which designated the United States.

BACKGROUND OF THE INVENTION

1. Field of the Invention

The invention relates to a method and an apparatus for linearity measurement in a reproduction appliance that contains an operating carriage bearing a scanning or recording device and that can be moved in discrete steps along a straight line.

Reproduction appliances that contain an operating carriage having a scanning or recording device are, for example, scanners, engraving machines, or exposers for printing plates, films, foils, paper, and so on. The drive to the operating carriage is generally provided through force transmission elements that are connected by a form fit, for example, spindles, racks, toothed belts, and/or gear wheels. Such force transmission elements have production-induced errors, which can impair the linearity of the advance travel, so that they have to be taken into account in the high resolution demanded of reproduction appliances.

For instance, in the case of exposers, a linearity of less than 0.01% ($1\times10^{-4}$) is required for both directions of the exposure. Thus, for a distance of one (1) meter, the linearity deviation must not be more than +/−50 $\mu$m. To achieve such accuracy in the advance direction of the operating carriage, one needs highly precise force transmission elements such as transport spindles, which operate on the circulating ball principle and have a pitch error of less than 1 $\mu$m per revolution. Such drive elements, such as those for the transmission of forces in precision machine tools, are very costly. In addition, they are over dimensioned for the use in reproduction appliances because the forces to be transmitted in reproduction appliances are relatively small. For the low-torque drive motors in exposers, they even have, with their configuration-induced torque fluctuations, considerable disadvantages.

In the case of reproduction appliances, it would intrinsically be possible to use simpler and, therefore, less accurate drive elements if the linearity error were measured and the drive to the reproduction appliances were corrected appropriately during operation. Methods of length measurement that supply the necessary accuracy are, for example, registering measured values by interferometers or glass scales. However, their resolution would have to be chosen to be significantly higher than the demanded measurement accuracy because these methods have superimposed systematic errors that exceed the theoretically achievable resolution many times over. In addition, such high-resolution length measurement systems are extremely complicated in terms of manufacture and application.

SUMMARY OF THE INVENTION

It is accordingly an object of the invention to provide a method and apparatus for linearity measurement that overcomes the hereinafore-mentioned disadvantages of the heretofore-known devices and methods of this general type such that a simple and cost-effective linearity measurement is made possible in a reproduction appliance.

With the foregoing and other objects in view, there is provided, in accordance with the invention, a method for linearity measurement in a reproduction appliance, including the steps of providing an operating carriage bearing at least one of a scanning device and a recording device, successively moving the operating carriage along partial segments of a straight line in discrete steps in a given direction along the straight line, each of the partial segments being longer than a travel corresponding to one of the steps and being shorter than the entire length of the line, the partial segments each having an exactly defined length defined by an additional carriage moveable along the given direction, counting a number of steps needed for each partial segment, and calculating deviations between values for a travel of the operating carriage resulting from the partial segment and values for the travel of the operating carriage resulting from counting the steps.

In that the necessary devices are integrated into the reproduction appliance, or are already present therein, the method can be carried out completely within the machine. Alternatively, a suitable measuring tool can be inserted into the machine and, after the recording and storage of the data, is removed again. The evaluation of the data can be carried out either in the reproduction appliance or outside it, for example, on a personal computer.

The counting of the discrete steps is available in any case in a reproduction appliance that has an incremental drive for the operating carriage, for example, a stepping motor, so that the internal machine measuring increments can additionally be used to carry out the method according to the invention. Otherwise, the counter values can be easily obtained electronically, for example, by an incremental encoder that is connected to the drive. It is, therefore, possible for internal machine measuring increments that are already present, such as the steps from a stepping motor or rotary encoder cycles, to be used additionally to carry out the method.

The only mechanical parts that have to be fabricated and adjusted precisely are the additional carriage and its drive. However, these precision requirements can be fulfilled without great expenditure because the length defined with the aid of the additional carriage is substantially shorter than the entire travel of the operating carriage.

In accordance with another mode of the invention, at the start the operating carriage is moved to the start of the line, and the additional carriage is moved into a first relative position between the operating carriage and the additional carriage. The additional carriage is then moved into a second relative position between the operating carriage and the additional carriage, the distance between the first and the second relative position corresponding to the length of a partial segment, also referred to as a part line. Next, the operating carriage is shifted forward while the discrete steps are counted and while the additional carriage remains in place. The operating carriage is stopped as soon as the first relative position between the operating carriage and the additional carriage has been reproduced. The additional carriage is then moved again into the second relative position while the operating carriage remains in place, and the alternating forward shifting of operating carriage and additional carriage is repeated until the entire line has been measured.

In accordance with a further mode of the invention, the part lines that are traveled over successively preferably all have the same length. As a result, both the definition of the precisely defined lengths and the evaluation of the measured results are made easier. Specifically, in accordance with added modes of the invention, the two relative positions between the operating carriage and the additional carriage can be defined or produced in a very simple way such as with mechanical stops, electromechanical drives, and/or optical sensors. The first relative position can be defined, for example, with the aid of a stop, while an optical device such as a differential light sensor are rather more suitable for defining the second relative position.

In accordance with an additional mode of the invention, the additional carriage is moved into the first relative position with an electromechanical device before traveling over each partial segment. The electromechanical device moves the additional carriage into the first relative position before traveling over each partial segment, the electromechanical device being connected to the additional carriage.

In accordance with yet another feature of the invention, the additional carriage is held in the first relative position with one of a self-locking device and self-retaining device while the operating carriage is shifted forward.

The additional carriage preferably has a self-locking device in order to remain in the first relative position when the operating carriage is shifted forward. Alternatively, an active brake or other blocking device can be provided for the additional carriage.

In accordance with yet a further mode of the invention, at least one of a light source and a reflector is fixed to one of the operating carriage and the additional carriage, and at least one of a differential light sensor and a reflector is fixed to another one of the operating carriage and the additional carriage.

In accordance with yet an added feature of the invention, the operating carriage is moved along the straight line with an elongate threaded spindle, preferably, a roller-burnished spindle, having a spindle pitch, the deviations between values for the travel of the operating carriage resulting from the partial segments and values for the travel of the operating carriage resulting from counting the steps corresponding to deviations between actual values of the spindle pitch and desired values of the spindle pitch.

The additional carriage is preferably guided on the linear guide that is present in any case for the operating carriage, but it can also have a dedicated guide track. Under certain circumstances, a dedicated guide track for the additional carriage may be more beneficial, for example, if the additional carriage represents a measuring tool that is inserted into the reproduction appliance to carry out the method and is subsequently removed again. In such a case, the measuring tool can also be used for linearity measurement on other machines.

The method according to the invention is so uncomplicated and can be carried out so simply that reproduction appliances can be equipped as standard with the additional carriage. As a result, when the reproduction appliance is switched on and/or on request by an operator of the reproduction appliance, self-balancing can be carried out, by the calculated deviations between the values for the travel of the operating carriage resulting from the partial segments and the values for the travel of the operating carriage resulting from counting the steps being used to correct the drive of the operating carriage during subsequent operation of the reproduction appliance.

In accordance with yet an additional feature of the invention, the spindle is rotated in discrete steps corresponding to constant rotational angles of the spindle.

In accordance with again another feature of the invention, the spindle is rotatably driven with a stepping motor.

With the objects of the invention in view, in a reproduction appliance containing an operating carriage bearing at least one of a scanning device and a recording device, the operating carriage being able to be moved in discrete steps in a given direction along a straight line, there is also provided an apparatus for linearity measurement including an additional carriage linearly moveable in the given direction between a first relative position and a second relative position having a position spacing corresponding to partial segments with an exactly defined length, each of the partial segments longer than a travel corresponding to one of the steps and shorter than the entire length of the line, and a device for calculating deviations between values for the travel of the operating carriage resulting from the partial segments and values for the travel of the operating carriage resulting from counting the steps.

In accordance with again another feature of the invention, there is also provided a drive connected to the operating carriage for driving the operating carriage, the drive having an elongate threaded spindle with a spindle pitch, the deviations between values for the travel of the operating carriage resulting from the partial segments and values for the travel of the operating carriage resulting from counting the steps representing deviations between actual values of the spindle pitch and desired values of the spindle pitch.

In many reproduction appliances, the operating carriage is moved by an elongate threaded spindle, which is driven in rotation by a drive motor. The deviations between the values for the travel of the operating carriage resulting from the partial segments and the values for the travel of the operating carriage resulting from counting the steps in such a case correspond to deviations between the current values of the spindle pitch and the desired values of the spindle pitch.

In the case in which the operating carriage is moved through a rack, a toothed belt, or the like, the method supplies deviations between the current values of the tooth pitch and the desired values of the tooth pitch.

The method according to the invention is suitable, for example, for reproduction appliances whose operating carriage is driven by force transmission elements connected by a form fit, such as spindles, racks, toothed belts and/or gear wheels that, although they have no slip, have reproducible and repeated, production-induced linearity errors including pitch or graduation errors, which can be both periodic and aperiodic.

Because these errors can be balanced out during subsequent operation of the reproduction appliance by appropriate correction of the drive, the force transmission elements when carrying out the method according to the invention merely have to satisfy the requirement that they produce repeated errors. For example, it is possible to use a simple roller-burnished spindle.

The method according to the invention is also suitable for reproduction appliances whose operating carriage is driven in any other way than by mechanical force transmission elements, provided these have repeated errors that can be corrected. Such a drive would, for example, be an electromagnetic linear motor whose rotor is fixed to the operating carriage.

If a spindle is used to advance the operating carriage, it is beneficial if the spindle is driven in rotation by a stepping motor. Stepping motors are cost-effective and can be obtained with very high-resolution incrementing of the revolution and also negligible systematic errors, comparable in qualitative terms with rotary encoders and timing disks.

For example, in the case of a spindle, in accordance with a concomitant feature of the invention, it is advantageous if the length of the partial segments that are traveled over successively during a measuring operation can be selected from at least two different predefined values, of which at least one is substantially smaller than the spindle pitch and at least one is substantially greater than the spindle pitch. As such, short-period pitch errors, that is to say errors within one spindle revolution, and/or long-period pitch errors, which extend over a plurality of spindle revolutions, can be registered as exactly as possible if desired. For gear drives, this applies in a corresponding way in relation to the tooth pitch.

Other features that are considered as characteristic for the invention are set forth in the appended claims.

Although the invention is illustrated and described herein as embodied in a method and apparatus for linearity measurement, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
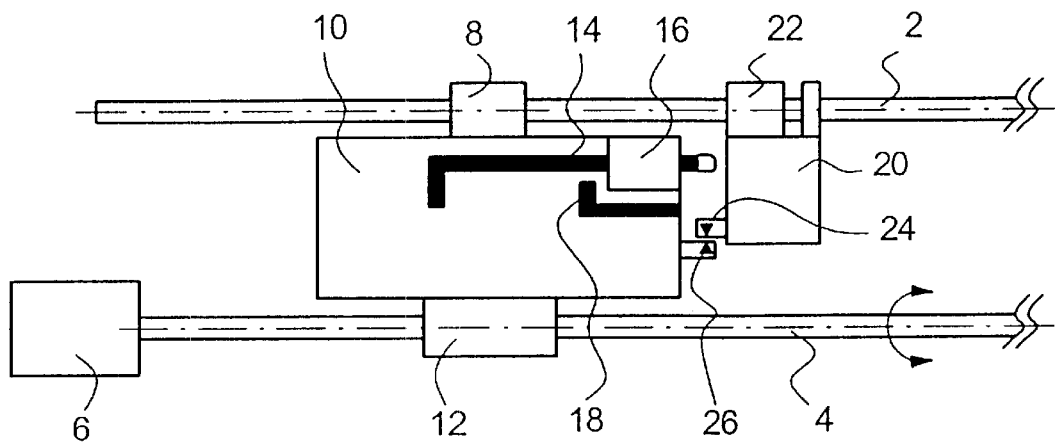
FIG. 1 is a fragmentary, elevational view of a part of a reproduction appliance illustrating an operating carriage and an additional carriage in a first position according to the invention.

Referring now to the figures of the drawings in detail and first, particularly to FIG. 1 thereof, there is shown a reproduction appliance containing at least one stationary elongate linear guide 2 that extends transversely over the width or length of a non-illustrated medium, which is intended to be scanned optically or on which optical information is intended to be recorded. Parallel to the linear guide 2 there extends an elongate spindle 4, which is provided on the outside with a thread. The spindle 4 is connected at one end to a stepping motor 6, which rotates the spindle 4 step-by-step when electrical control pulses are fed to it. Each step corresponds to a constant rotational angle of the spindle 4, for example, $\frac{1}{10,000}^{th}$ of a revolution. The rotational speed of the spindle 4 corresponds to the frequency of the control pulses fed to the stepping motor 6.

Mounted on the at least one linear guide 2, by a schematically illustrated sliding bearing 8, is an operating carriage 10, which can be displaced in the direction of the linear guide 2. The operating carriage 10 engages with the thread on the spindle 4 by a locking element 12, for example, a play-free split nut, shown schematically. The operating carriage 10, therefore, moves slowly to the right or left (with respect to FIG. 1) when the stepping motor 6 rotates the spindle 4 in one direction or the other.

The operating carriage 10 bears a non-illustrated scanning or recording device, for example, a sensor or a sensor array for the optical scanning of originals, an engraving head, an exposure head, or a printing head.

In addition, the operating carriage 10 bears an elongate caliper gauge 14, which extends parallel to the linear guide 2 and is mounted in a housing 16, so that the caliper gauge 14 can be displaced parallel to the linear guide 2 in relation to the operating carriage 10. The movement clearance of the caliper gauge 14 in the forward direction, that is to say to the right with respect to FIG. 1, is defined exactly. To be specific, the caliper gauge 14 can be shifted forward until it strikes a stop 18 that is fixed to the operating carriage 10. The caliper gauge 14 then assumes the position shown with dashes in FIG. 2 in relation to the operating carriage 10. FIG. 1 shows the pulled-back position of the caliper gauge 14, which does not need to be defined exactly. Not shown is a suitable electromagnetic drive for the caliper gauge 14, with which drive the caliper gauge 14 can be shifted forward and, if necessary, can be pulled back. Such a drive can be, for example, an electromagnet or electric motor incorporated in the housing 16.

In addition, an additional carriage 20 is displaceably mounted on the linear guide 2 and, if appropriate, on further parallel linear guides, by a sliding bearing 22. The mounting of the additional carriage 20 on the linear guide 2 includes any kind of self-locking device, for example, a movement damping device, so that the additional carriage 20 normally remains in place and can be displaced only by overcoming the self-locking.

In an alternative non-illustrated embodiment, the caliper gauge 14 is fitted to the additional carriage 20 rather than to the operating carriage 10.

In each case, part of a device for registering a first relative position is fitted to the operating carriage 10 and to the additional carriage 20. In such an example, a light source 24 is fixed to the additional carriage 20, and a differential diode 26 is fixed to the operating carriage 10. The light source 24 produces a small spot of light on the differential diode 26 when the operating carriage 10 and the additional carriage 20 are located in the first relative position shown in FIG. 1. The differential diode 26, which has two closely adjacent light-sensitive areas, whose output signals are compared with each other, permits very accurate definition of the first relative position.

Figure 2:
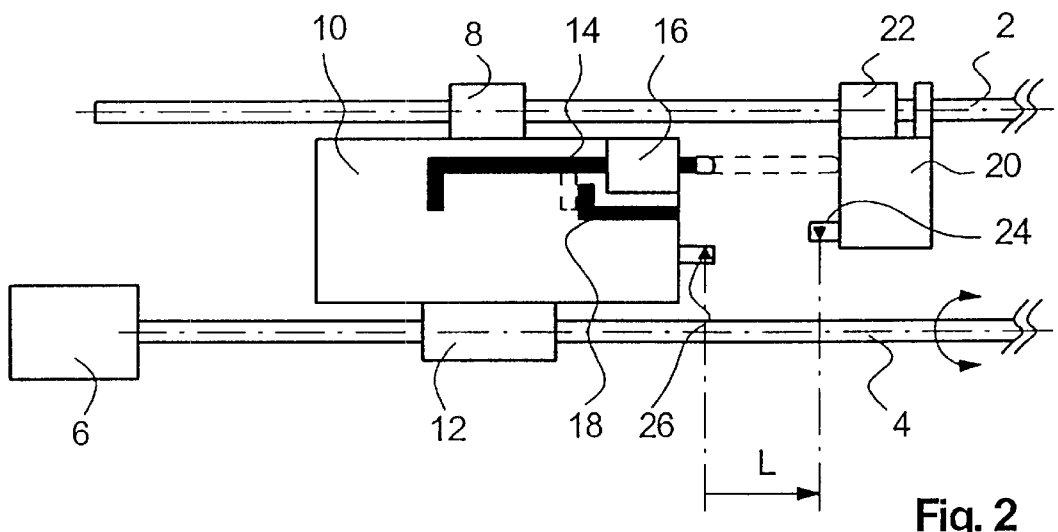
FIG. 2 is a fragmentary, elevational view of the appliance of FIG. 1 in a second position.

The method of measuring the linearity of the spindle 4 will now be described with reference to FIGS. 1, 2, and 4. The method can be carried out automatically, for example, under the control of a microprocessor.

Figure 4:
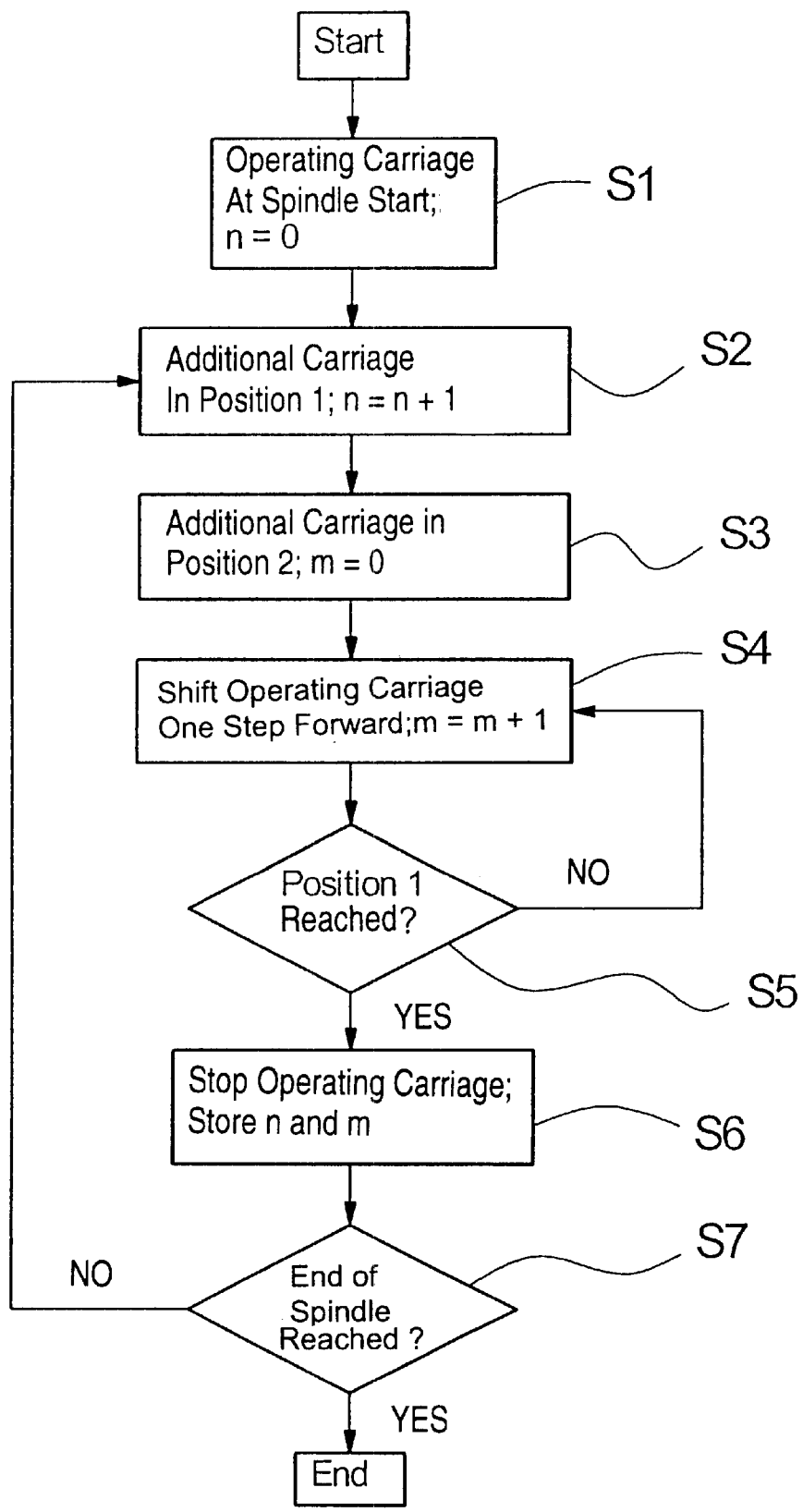
FIG. 4 is a flow chart explaining the measuring operation according to the invention.

First of all, the operating carriage 10 is moved by the stepping motor 6 into an exactly defined starting position on the extreme left in FIG. 1 and is fixed there (S1 in FIG. 4). The additional carriage 20 is moved into the first relative position (FIG. 1) in relation to the operating carriage 10, the first relative position being defined by the fact that the differential diode 26 registers the correct position of the spot of light from the light source 24 (S2).

Next, the caliper gauge 14 is extended as far as the stop 18 with the operating carriage 10 at a standstill. As a result, the additional carriage 20 is displaced by an exactly defined measuring interval L into the second relative position (FIG. 2), where it remains (S3) on account of the self-locking. The caliper gauge 14 can then be drawn back, or the drive to the caliper gauge 14 is deactivated or disengaged, depending on the operating principle, so that the caliper gauge 14 can slide back easily during the further procedure.

Next, the spindle 4 is caused to rotate by the stepping motor 6 so that the operating carriage 10 is shifted slowly forward step by step. After each advance step (S4), a check is made as to whether or not the first relative position (FIG. 1) between the operating carriage 10 and the additional carriage 20 has been reached again (S5). The drive to the operating carriage 10 is stopped (S6) as soon as the differential diode 26 registers the fact that the first relative position has been reached.

Incidentally, the movement of the operating carriage 10 during the linearity measurement must be carried out so slowly that the operating carriage 10 stops virtually immediately without traveling beyond the first relative position. A higher measuring speed may be achieved if, for example, a further light source or differential diode is used, in order to generate a signal to reduce the measuring speed shortly before the first relative position is reached.

A check is then made as to whether or not the end of the spindle 4 or the end of the line to be measured has been reached (S7). If not, the additional carriage 20 is moved into the first relative position again (S2) with the operating carriage 10 at a standstill and the method is continued until the end of the spindle has been reached.

For each measuring interval L, the consecutive number n (S2) of the measuring interval, which was set to "zero" at the start (S1), and the number mi of the discrete steps that have been needed to travel through the $i^{th}$ measuring interval L, are stored (S6). When x is the constant length of the discrete steps that the operating carriage 10 completes when it is shifted forward by the stepping motor 6, the magnitude:

$$f(n) = n*L - x*\sum_{i=1}^{n} m_i$$

is the difference between values for the travel n L of the operating carriage 10 that result based on the part lines or measuring intervals L and values for the travel of the operating carriage 10 that result from counting the total number of steps needed.

Figure 3:
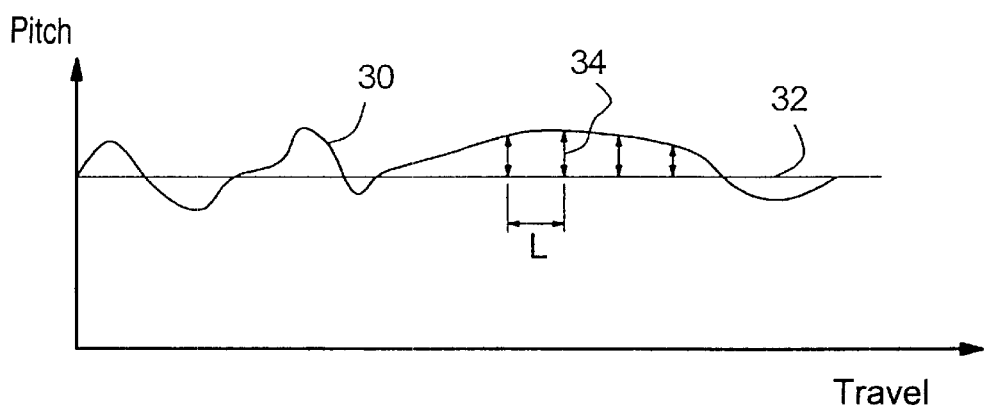
FIG. 3 is a graph illustrating the spindle pitch of the appliance of FIG. 1 as a function of travel.

From the calculation, the actual pitch of the spindle 4 may be calculated as a function of the travel of the operating carriage 10. In FIG. 3, the actual pitch of the spindle 4 is represented by a curve 30. The desired pitch is represented by a straight line 32. At some points, vertical double arrows 34 show the differences between desired and actual pitch, which correspond to the values of f(n). The horizontal double arrow shows the length of a measuring interval L.

The variables f(n) determined, or variables derived from these, are stored and, during subsequent operation of the reproduction appliance, are used to correct the frequency of the control pulses for the stepping motor 6 in each measuring interval L such that the operating carriage 10 moves exactly linearly. In a measuring interval L in which the actual pitch is smaller than the desired pitch, the frequency of the control pulses is increased somewhat, and in a measuring interval L in which the actual pitch is greater than the desired pitch, the frequency of the control pulses is reduced somewhat. The correction is likewise carried out automatically by a microprocessor.

The length L of the measuring intervals is chosen to coordinate with the pitch of the spindle 4, the resolution of the stepping motor 6, and the errors to be measured and to be corrected. As an example, it is assumed that the spindle 4 has a pitch of 2 mm and that the stepping motor 6 has an angular resolution of 10,000 discrete steps per revolution. The length x of the discrete steps that the operating carriage 10 completes when it is shifted forward by the stepping motor 6 is then 0.2 μm. If the measuring interval L is made as large as the pitch, that is to say 2 mm, the linearity measurement has an accuracy of 0.2 μm per measuring interval. However, with each further measuring interval, errors that are made in the definition of the length L, in spite of every care, add up. As the spindle length increases, therefore, the error becomes larger.

Nevertheless, in order to be able to register long-period (low-frequency) fluctuations of the spindle pitch accurately over the entire spindle length, the length L of the measuring intervals is chosen to be greater, for example, ten or more spindle pitches. To register short-period (high-frequency) pitch errors, that is to say errors within one spindle revolution, accurately, the length L of the measuring intervals is chosen to be smaller, for example, one-tenth of the spindle pitch. Measurements with a small or large measuring interval can optionally be carried out individually or one after another to register different types of pitch errors exactly.

If an accuracy of the linearity measurement per measuring interval of, for example, 0.2 μm is demanded, then the differential diode 26 must be able to detect the position of the light source 24 with just such an accuracy. The accuracy can be achieved without difficulty by using differential diodes. In principle, however, other sensors for position detection are also considered, for example, forked light barriers, provided the accuracy requirements existing in the individual case are fulfilled.

In the following text, some possible modifications and developments of the exemplary embodiment described above are described.

In the exemplary embodiment, the caliper gauge 14 was described as a simple slider with a sliding bearing. In the case of such a device, it may be difficult to ensure the exact reproducibility of the advance travel. To avoid problems with bearing play and wear, the caliper gauge 14 can slide, for example, on a prism guide with a ball circulation.

Instead of a mechanical stop 18 for the caliper gauge 14, a sensor can be used, such as a further differential diode. With the aid of the sensor, the drive to the caliper gauge 14 is stopped as soon as it is completely extended. In such a case, a high-resolution stepping motor preferably drives the caliper gauge 14. If the stepping motor is connected to the caliper gauge 14 through a precision threaded spindle, which would be significantly less complicated than a precision spindle over the entire machine length, it would be possible to dispense with the sensor for registering the end position of the caliper gauge 14. In addition, the advance travel of the caliper gauge 14, that is to say the measuring interval L, could be chosen completely freely. In such a case, the measuring intervals L could be chosen to have different lengths within a measuring operation, that is to say, there would be the possibility of measuring the spindle 4 section by section with different resolution.

The additional carriage 20 does not have to be guided on the same linear guide 2 as the operating carriage 10, but can have a dedicated guide, for example, a prism guide with ball circulation.

Instead of a self-locking device for the additional carriage 20, an active brake can be provided, for example, a mechanical blocking device or an electromagnet, with which the additional carriage 20 can be held firmly on its guide.

The configuration of the light source 24 and the differential diode 26 on the additional carriage 20 and on the operating carriage 10 can be interchanged. In addition, the light source 24 and/or the differential diode 26 do not need to be fitted to the additional carriage 20 and to the operating carriage 10 respectively, but can be disposed at any other point in the reproduction appliance. In such a case, the additional carriage 20 and the operating carriage 10 bear some kind of light deflection device, for example, one or more reflectors that receive the light from the light source and pass it on to the differential diode or other sensor device. Such an external configuration is expedient, in particular, in the case of the additional carriage 20 because flexible electric leads to the additional carriage 20 are dispensed with.

In the exemplary embodiment, use was made of the rotational angle increments of the stepping motor 6. Instead of rotational angle increments, sufficiently accurate distance or time increments can also be used, if the drive motor makes such increments available as a result of its construction or if any kind of measuring sensor that generates appropriate distance or time increments is provided on the drive.

We claim:

1. A method for linearity measurement in a reproduction appliance, which comprises:

providing an operating carriage bearing at least one of a scanning device and a recording device;

successively moving the operating carriage along partial segments of a straight line in discrete steps in a given direction along the straight line, each of the partial segments being longer than a travel corresponding to one of the steps and being shorter than the entire length of the line, the partial segments each having an exactly defined length defined by an additional carriage moveable along the given direction;

counting a number of steps needed for each partial segment; and calculating deviations between values for a travel of the operating carriage resulting from the partial segment and values for the travel of the operating carriage resulting from counting the steps.

2. The method according to claim 1, which further comprises:

moving the operating carriage to a start of the line and moving the additional carriage into a first relative position disposed between the operating carriage and the additional carriage;

moving the additional carriage into a second relative position disposed between the operating carriage and the additional carriage with the distance between the first and the second relative positions corresponding to the length of the partial segment;

shifting the operating carriage forward while the discrete steps are counted and while the additional carriage remains in position;

stopping the operating carriage as soon as the first relative position between the operating carriage and the additional carriage has been reproduced; and repeating the previous three steps over the line to be measured.

3. The method according to claim 2, defining the first relative position between the operating carriage and the additional carriage with a mechanical device.

4. The method according to claim 3, wherein the mechanical device for defining the first relative position between the operating carriage and the additional carriage is a stop.

5. The method according to claim 2, which further comprises moving the additional carriage into the first relative position with an electromechanical device before traveling over each partial segment.

6. The method according to claim 2, which further comprises holding the additional carriage in the second relative position with one of a self-locking device and self-retaining device while the operating carriage is shifted forward.

7. The method according to claim 2, which further comprises defining the second relative position between the operating carriage and the additional carriage with an optical device.

8. The method according to claim 7, wherein the optical device includes at least one of:

a light source;

a reflector; and a differential light sensor, fixed to at least one of the operating carriage and the additional carriage.

9. The method according to claim 1, wherein the partial segments traveled over successively all have the same length.

10. The method according to claim 1, which further comprises carrying out the linearity measurement at least one of:

when the reproduction appliance is switched on; and on request by an operator of the reproduction appliance; and correcting a drive of the operating carriage in subsequent operation of the reproduction appliance using the deviations calculated in the process between values for the travel of the operating carriage resulting from the partial segments and values for the travel of the operating carriage resulting from counting the steps.

11. The method according to claim 1, which further comprises moving the operating carriage along the straight line with an elongate threaded spindle having a spindle pitch, the deviations between values for the travel of the operating carriage resulting from the partial segments and values for the travel of the operating carriage resulting from counting the steps corresponding to deviations between actual values of the spindle pitch and desired values of the spindle pitch.

12. The method according to claim 11, wherein the spindle is a roller-burnished spindle.

13. The method according to claim 11, which further comprises rotating the spindle in discrete steps corresponding to constant rotational angles of the spindle.

14. The method according to claim 13, which further comprises rotatably driving the spindle with a stepping motor.

15. The method according to claims 11, which further comprises selecting the length of the partial segments traveled over successively during a measuring operation from at least two different predefined values, at least one of the predefined values being smaller than the spindle pitch and at least another of the predefined values being larger than the spindle pitch.

16. In a reproduction appliance containing an operating carriage bearing at least one of a scanning device and a recording device, the operating carriage being able to be moved in discrete steps in a given direction along a straight line, an apparatus for linearity measurement comprising:

an additional carriage linearly moveable in the given direction between a first relative position and a second relative position having a position spacing corresponding to partial segments with an exactly defined length, each of said partial segments longer than a travel corresponding to one of the steps and shorter than the entire length of the line; and a device for calculating deviations between values for the travel of the operating carriage resulting from said partial segments and values for the travel of the operating carriage resulting from counting the steps.

17. The apparatus according to claim 16, wherein said partial segments traveled over successively all have the same length.

18. The apparatus according to claim 16, including a mechanical device for defining said first relative position between the operating carriage and said additional carriage.

19. The apparatus according to claim 18, wherein said mechanical device is a stop.

20. The apparatus according to claim 18, including an optical device for defining said second relative position between the operating carriage and said additional carriage.

21. The apparatus according to claim 16, including an electromechanical device for moving said additional carriage into said first relative position before traveling over each partial segment, said electromechanical device being connected to said additional carriage.

22. The apparatus according to claim 16, wherein said additional carriage has a self-locking device.

23. The apparatus according to claim 16, including an optical device for defining said second relative position between the operating carriage and said additional carriage.

24. The apparatus according to claim 23, wherein said optical device includes:
   at least one of a light source and a reflector fixed to one of the operating carriage and said additional carriage; and
   at least one of a differential light sensor and a reflector fixed to another one of the operating carriage and said additional carriage.

25. The apparatus according to claim 23, wherein said optical device includes at least one of:
   a light source;
   a reflector; and
   a differential light sensor,
   fixed to at least one of the operating carriage and said additional carriage.

26. The apparatus according to claim 16, including a drive connected to the operating carriage for driving the operating carriage, the drive having an elongate threaded spindle with a spindle pitch, the deviations between values for the travel of the operating carriage resulting from the partial segments and values for the travel of the operating carriage resulting from counting the steps representing deviations between actual values of the spindle pitch and desired values of the spindle pitch.

27. The apparatus according to claim 26, wherein said spindle is a roller-burnished spindle.

28. The apparatus according to claim 26, including a stepping motor connected to said spindle for rotatably driving said spindle.

* * * * *